United States Patent
Ream et al.

(10) Patent No.: US 8,481,886 B2
(45) Date of Patent: Jul. 9, 2013

(54) POLYGONAL LASER SCANNER FOR COATING REMOVAL

(75) Inventors: Stanley L. Ream, Columbus, OH (US); Craig T. Walters, Powell, OH (US)

(73) Assignee: Edison Welding Institute, Columbus, OH (US)

( * ) Notice: Subject to any disclaimer, the term of this patent is extended or adjusted under 35 U.S.C. 154(b) by 128 days.

(21) Appl. No.: 12/972,929

(22) Filed: Dec. 20, 2010

(65) Prior Publication Data

US 2011/0147354 A1    Jun. 23, 2011

Related U.S. Application Data

(60) Provisional application No. 61/289,826, filed on Dec. 23, 2009.

(51) Int. Cl.
*B23K 26/06* (2006.01)
*B23K 26/36* (2006.01)

(52) U.S. Cl.
USPC .................................. 219/121.68; 219/121.74

(58) Field of Classification Search
USPC .... 219/121.6, 121.68, 121.69, 121.84; 134/1; 227/181.1; 347/256–261; 359/212.2, 216.1–217.3, 226.1, 226.2; 250/492.1; 427/551, 427/554–556; 118/620, 641
See application file for complete search history.

(56) References Cited

U.S. PATENT DOCUMENTS

| | | | |
|---|---|---|---|
| 4,764,672 A | 8/1988 | Wu et al. | |
| 5,220,450 A | 6/1993 | Iizuka | |
| 5,341,824 A | 8/1994 | Fletcher et al. | |
| 5,736,709 A * | 4/1998 | Neiheisel | 219/121.61 |
| 7,187,398 B2 | 3/2007 | Carlson et al. | |
| 2001/0046033 A1 | 11/2001 | Troyer | |
| 2002/0136971 A1 | 9/2002 | Ito et al. | |
| 2004/0227922 A1 | 11/2004 | Dierichs et al. | |
| 2009/0007933 A1 | 1/2009 | Thomas et al. | |

FOREIGN PATENT DOCUMENTS

| | | |
|---|---|---|
| KR | 20040058615 A | 7/2004 |
| WO | 9520253 A2 | 7/1995 |
| WO | 0057348 A1 | 9/2000 |

OTHER PUBLICATIONS

International Search Report and Written Opinion received in PCT/US2011/063862, mailed Apr. 13, 2012.
International Search Report and Written Opinion received in PCT/US2010/061290, Feb. 24, 2011.

* cited by examiner

*Primary Examiner* — Samuel M Heinrich
(74) *Attorney, Agent, or Firm* — McNees, Wallace & Nurick

(57) ABSTRACT

A laser scanner system for removing a coating from a surface. The system includes a laser source for generating a laser beam; a focusing optic operative to receive, focus and re-direct the laser beam; a rotating multi-faceted mirror for receiving and reflecting the focused laser beam, wherein the rotating multi-faceted mirror repeatedly translates the reflected focused laser beam in one direction along an arc path and through a first focal point, and wherein passage of the laser beam through the first focal point results in divergence of the beam; a reimaging mirror for receiving and reflecting the divergent laser beam toward a work surface, wherein the reimaging mirror produces an image of the first focal point and its path; and wherein the rotating multi-faceted mirror and the reimagining mirror cooperate to produce a beam cross-over region having a minimal cross-sectional area relative to other points along the beam path, and wherein the beam cross-over region is located between the reimaging mirror and the work surface.

39 Claims, 8 Drawing Sheets

US 8,481,886 B2

POLYGONAL LASER SCANNER FOR COATING REMOVAL

CROSS-REFERENCE TO RELATED APPLICATIONS

This patent application claims the benefit of U.S. Provisional Patent Application Ser. No. 61/289,826 filed on Dec. 23, 2009 and entitled "Polygonal Laser Scanner for Coating Removal," the disclosure of which is hereby incorporated by reference herein in its entirety and made part of the present U.S. utility patent application for all purposes.

BACKGROUND OF THE INVENTION

The present invention relates generally to systems and devices utilizing lasers, and more specifically to a system for removing materials such as paint and other coatings from various surfaces, wherein the system includes a laser scanner having multiple cooperative optics having unique characteristics.

The application of laser technology for the removal of coatings developed several decades ago and small hand-held devices (100-500 W) are now available commercially for small area coating removal tasks. "Coating" typically refers to all types of unwanted surface material found on a substrate, including paint, rust, oil, grease, adhesives, sealant, barnacles, radioactive contamination, chemical agent contamination, and the like. Laser technology offers numerous advantages over conventional methods for removal of coatings (e.g., media blasting, chemical stripping, etc.), including no use of hazardous materials, no required inventory of expendable material, minimal preparation of the object to be processed, greater precision of coating removal, higher coating removal rates, and minimal post-process cleanup.

Options for large area coating removal with lasers are currently being developed. To meet the desired coating removal rates for large areas (such as large aircraft surfaces, ships, buildings, and bridges), laser power levels in the 5 to 10-kW range are suitable for applications involving paint coatings. The desired removal rates are in the range of about 1 to 3 $ft^2$/min. The typical removal rate that can be achieved with currently available lasers is about 2 $ft^2$/min (per 1 mil of coating thickness for each 1 kW of laser power delivered to the surface). This rate of removal presumes that the laser beam is delivered to the surface in an appropriate pattern and is scanned across the surface at rates that remove coating without alteration of the substrate when it is exposed.

For delicate or unstable substrates, such as 0.020-inch thick aluminum, the system for scanning a laser beam over the surface should achieve clean coating removal without causing thermal damage, charring, or otherwise altering the substrate. Some success has been achieved with galvanometer-based oscillatory scanning mirrors; however, these scans are limited in surface scan speed to typically less than 10 m/s and suffer from dead zones at the end of the scan where the mirror decelerates, reverses, and reaccelerates. These dead zones may be eliminated in practice with beam blockers that limit the scan width and lose average power at the work surface. Other limitations of currently available oscillatory scanners are power handling capability (<6 kW) and weight (>60 lbs). Due to the limitations of known systems, there an ongoing need for an advanced laser scanner system that will meet the requirements of certain industrial or governmental applications requiring laser power levels up to 10 kW.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a laser scanner system for removing a coating from a surface is provided. This system includes a laser source for generating a laser beam; a focusing optic operative to receive, focus and re-direct the laser beam; a rotating multi-faceted mirror for receiving and reflecting the focused laser beam, wherein the rotating multi-faceted mirror repeatedly translates the reflected focused laser beam in one direction along an arc path and through a first focal point, and wherein passage of the laser beam through the first focal point results in divergence of the beam; a reimaging mirror for receiving and reflecting the divergent laser beam toward a work surface, wherein the reimaging mirror produces an image of the first focal point and its path; and wherein the rotating multi-faceted mirror and the reimagining mirror cooperate to produce a beam cross-over region having a minimal cross-sectional area relative to other points along the beam path, and wherein the beam cross-over region is located between the reimaging mirror and the work surface.

In accordance with another aspect of the present invention, a laser scanner system for removing a coating from a surface is provided. This system includes at least one laser source for generating a laser beam; at least one focusing optic operative to receive, focus and re-direct the laser beam; at least one rotating multi-faceted mirror for receiving and reflecting the focused laser beam, wherein the rotating multi-faceted mirror repeatedly translates the reflected focused laser beam in one direction along an arc path and through a first focal point, and wherein passage of the laser beam through the first focal point results in divergence of the beam; at least one reimaging mirror for receiving and reflecting the divergent laser beam toward a work surface, wherein the reimaging mirror produces an image of the first focal point and its path; and wherein the rotating multi-faceted mirror and the reimagining mirror cooperate to produce a beam cross-over region having a minimal cross-sectional area relative to other points along the beam path, and wherein the beam cross-over region is located between the reimaging mirror and the work surface; and a nozzle assembly through which the reimaged laser beam passes. The nozzle assembly further includes a first nozzle component, the interior surface of which tapers inward; a second nozzle component connected to the first nozzle component, wherein the interior surface of the second nozzle component tapers outward; and an aperture through which the laser beam exits the scanner. The aperture is located between the first and second nozzle components and is positioned in the vicinity of the crossover region.

In yet another aspect of this invention, a laser scanner system for removing a coating from a surface is provided. This system includes at least one laser source for generating a laser beam; at least one focusing optic operative to receive, focus and re-direct the laser beam; at least one rotating multi-faceted mirror for receiving and reflecting the focused laser beam, wherein the rotating multi-faceted mirror repeatedly translates the reflected focused laser beam in one direction along an arc path and through a first focal point, and wherein passage of the laser beam through the first focal point results in divergence of the beam; at least one reimaging mirror for receiving and reflecting the divergent laser beam toward a work surface, wherein the reimaging mirror produces an image of the first focal point and its path; and wherein the rotating multi-faceted mirror and the reimagining mirror cooperate to produce a beam cross-over region having a minimal cross-sectional area relative to other points along the beam path, and wherein the beam cross-over region is located between the reimaging mirror and the work surface; and a nozzle assembly through which the reimaged laser beam passes. The nozzle assembly further includes a first nozzle component, the interior surface of which tapers inward; a second nozzle component connected to the first nozzle component, wherein the interior surface of the second nozzle component tapers outward; and an aperture through which the laser beam exits the scanner. The aperture is located between the first and second nozzle components and is positioned in the vicinity of the crossover region. Also included is a housing for containing the at least one focusing optic, the at least one rotating multi-faceted mirror, and the at least one reimaging mirror.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Figure 1:
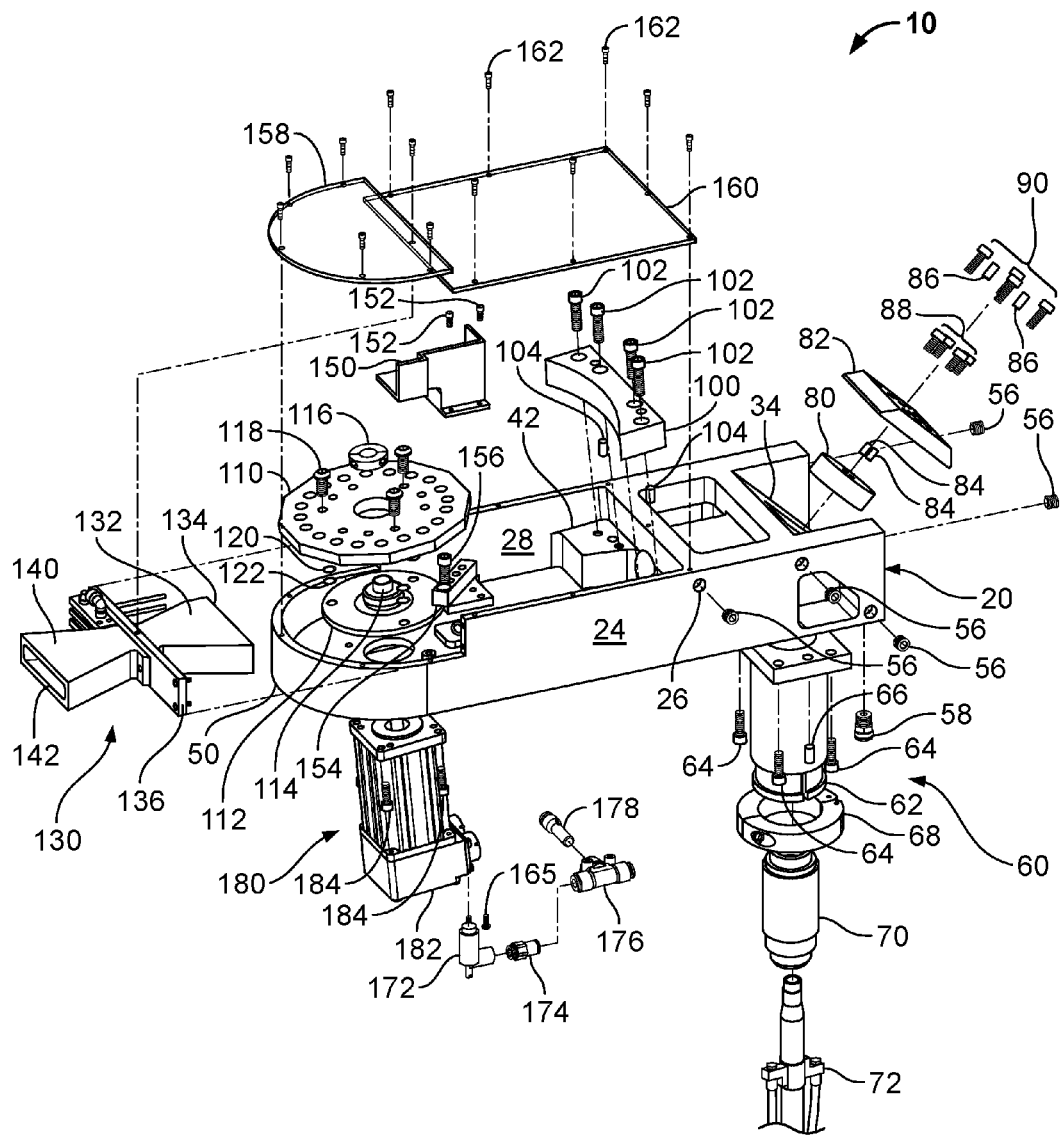
FIG. 1 is an exploded, perspective view of an exemplary embodiment of a laser scanner in accordance with the present invention.
Figure 2:
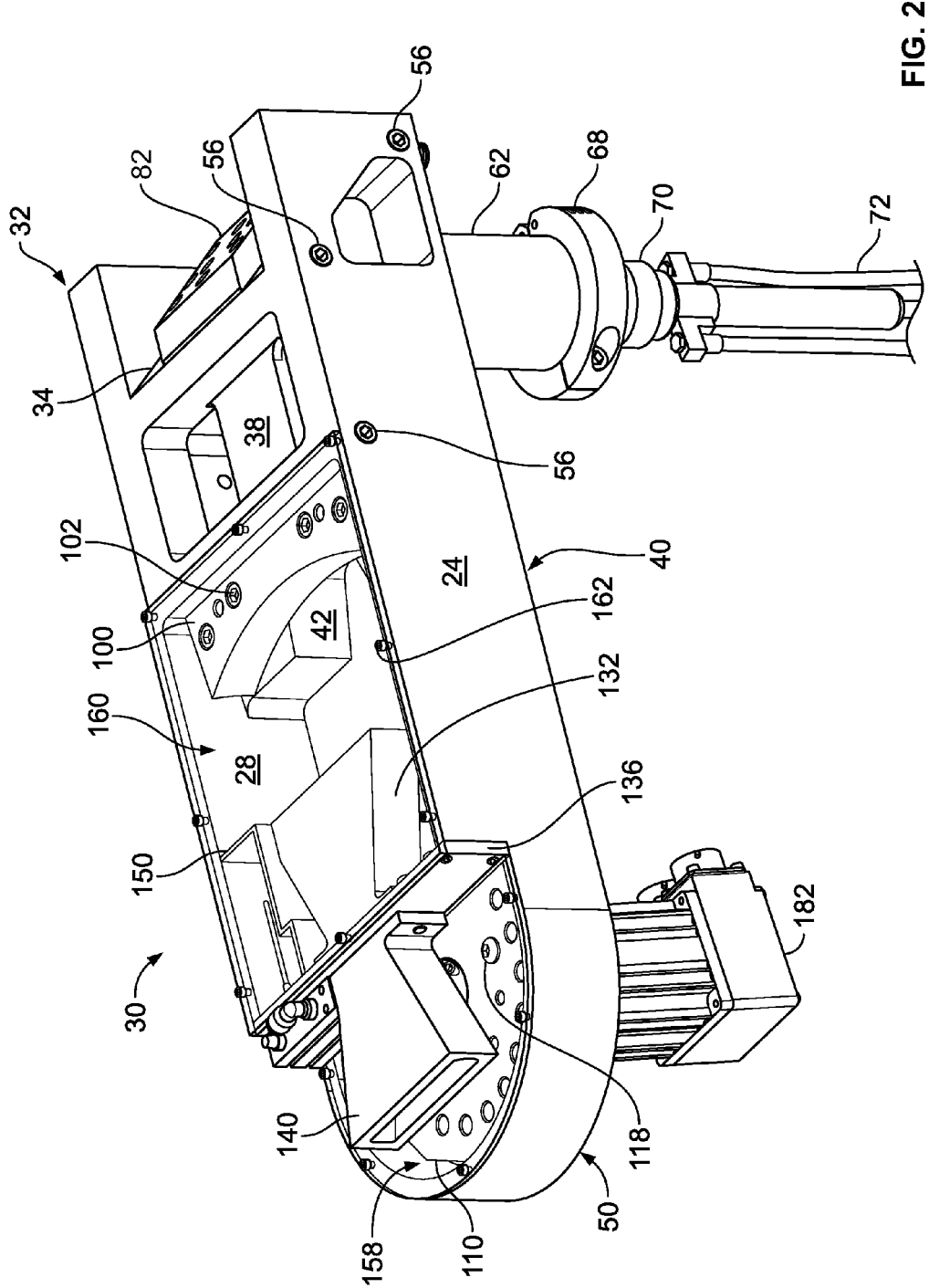
FIG. 2 is a perspective view of the laser scanner of FIG. 1 shown in an assembled state.
Figure 3:
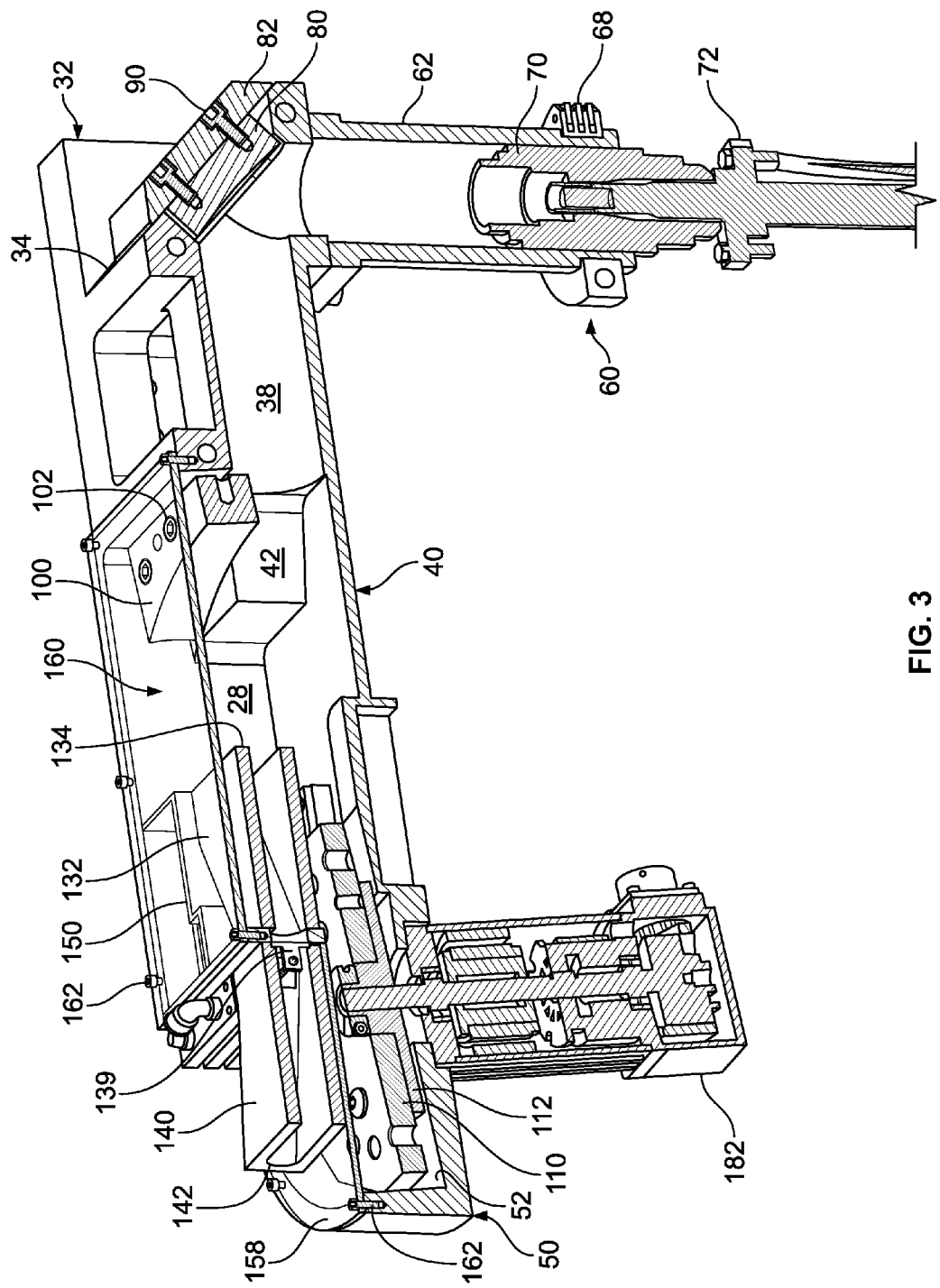
FIG. 3 is a cutaway perspective view of the laser scanner of FIG. 2 showing the relative positions of the internal components.

Exemplary embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention. The present invention relates to a system for removing materials such as paint and other coatings from various surfaces, wherein the system includes a laser scanner having multiple optics. With reference now to the Figures, one or more specific embodiments of this invention shall be described in greater detail.

As best shown in FIGS. 1-6, an exemplary embodiment of laser scanner 10 includes a metal housing or body 20 that further includes rear wall 22, first side wall 24 having apertures 26 formed therein, second side wall 28, front 30, top portion 32, angled support 34 having apertures 36 formed therein, conduit 38, middle portion 40, left support 42 having apertures 44 formed therein, right support 46 (not shown) having apertures 48 (not shown) formed therein, bottom portion 50, angled support 52, and aperture 54. NPT plugs 56 are typically inserted into apertures 26 and at least one NPT fitting 58 is typically inserted into rear wall 22. Laser assembly 60 includes fiber mounting bracket 62, which is attached to rear wall 22 using connectors 64 and pins 66. Shaft clamp 68 connects fiber adapter 70 to fiber mounting bracket 62 after fiber assembly 72 has been inserted into fiber adapter 70.

The first optic included in exemplary laser scanner 10 is a parabolic mirror or an asymmetric asphere lens or mirror 80, which is disposed within angled support 52 in body 20 and held in place by mirror mount 82. Asymmetric asphere mirror 80 is secured to mirror mount 82 by pins 84 and connectors 88, while mirror mount 82 is secured to angled support 52 by pins 86 and connectors 90 (see FIG. 1). The second optic included in exemplary laser scanner system 10 is a torodial reimaging mirror 100, which is secured to left support 42 by connectors 102 and pin 104 and to right support 46 (not shown) by connectors 106 (not shown) and pin 108 (not shown). The third optic included in exemplary laser scanner system 10 is a multi-faceted rotating polygonal mirror 110. Polygonal mirror 110 is secured to mirror spindle 112 by connectors 118, which typically include a nylon lock and washers 120 and 122 (see FIG. 1). Post 114 on mirror spindle 112 is adapted to receive the drive shaft of servo motor 182, which extends through aperture 54 and shaft clamp 116 secures the drive shaft within post 114. Motor assembly 180 and servo motor 182, in particular, is used to rotate polygonal mirror 110 and is connected to rear wall 22 of body 20 by connectors 184.

Figure 6:
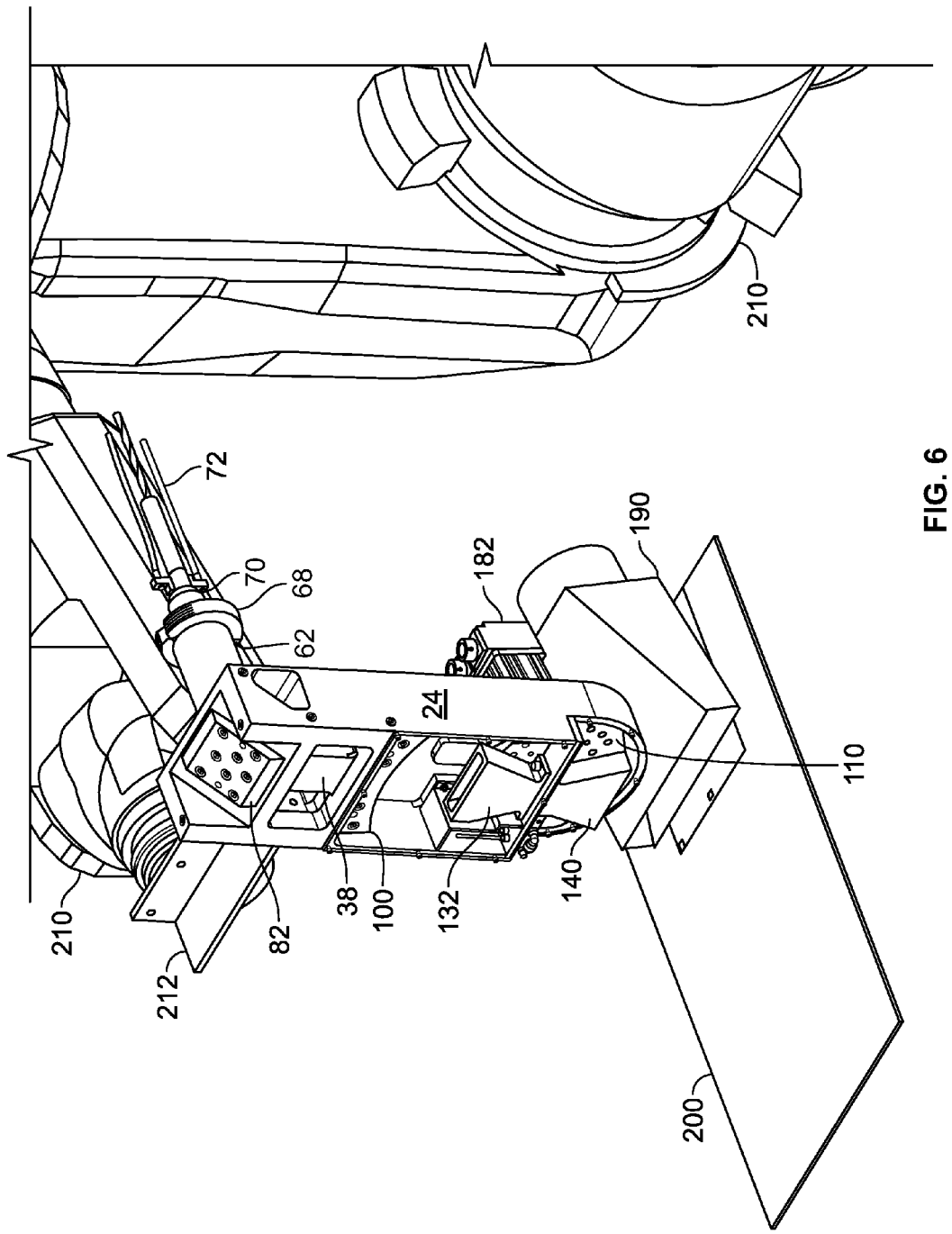
FIG. 6 is a perspective view of the laser scanner of FIG. 2 shown attached to a robotic arm and properly oriented relative to a particular workpiece.

Nozzle assembly 130 includes top portion 132 having an entrance port 134 and inwardly tapered internal passage, divider 136 having an aperture 138 formed therein, and bottom portion 140 having an exit port 142 and an outwardly tapered internal passage. Aperture 138 is essentially an aerodynamic opening that permits flowing gas from the interior of the device to escape, thereby reducing or minimizing the introduction of dirt and other contaminants into the interior of the laser scanner. The fundamental nature of the re-imaged, polygon-scanned, laser beam permits this aerodynamic window to be small, thus improving its resistance to contaminant intrusion. In some embodiments of the present invention, a shutter 139 is included for selectively closing aperture 138. As best shown in FIG. 1, laser protection cover 150 is secured to body 20 by connectors 152 and nozzle jet 154 is secured to body 20 by connector 152. The internal components of system 10 are protected by polygon cover plate 158 and main cover plate 160, which are both secured to body 20 by connectors 162. Cover plates 158 and 160 are typically metal and are shown in the Figures as being transparent only for purposes of illustration. Flow regulator 172, tube fitting 174, T-connector 176, and tube adapter 178 are components of a gas delivery system that may be used to rotate multi-faceted polygonal mirror 110 if motor assembly 180 is absent or not utilized. In some embodiments of the present invention, an exhaust system is included for removing debris generated during the operation of system 10. As shown in FIG. 6, exhaust nozzle 190 is mounted near bottom portion 50 and is connected to one or more ducts and exhaust motors (not shown) for quickly and effectively removing particulate matter from substrate 200. Exhaust nozzle 190 is typically of light weight metallic construction and may contain internal air delivery features to assist in complete combustion of the evaporants from the work surface whose coating (e.g. paint) is being removed. In the embodiment shown in FIG. 6, laser scanner 10 is controlled by a robotic arm 210 and is attached thereto by bracket 212. In other embodiments, laser scanner 10 is configured as a hand-held device that may be operated manually.

Figure 4:
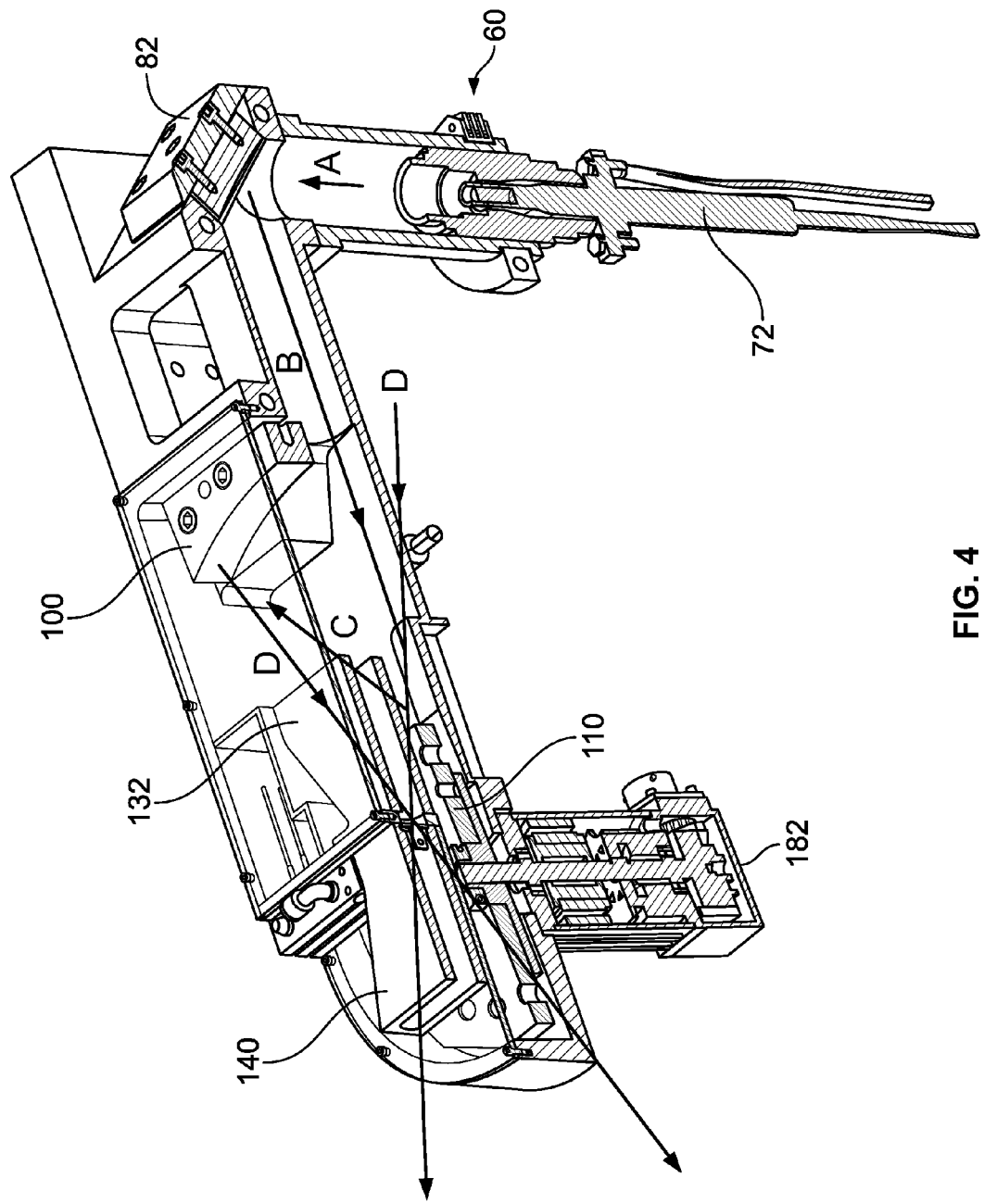
FIG. 4 is a cutaway perspective view of the laser scanner of FIG. 2 illustrating the changes in direction of the beam path through the device when in use.
Figure 5:
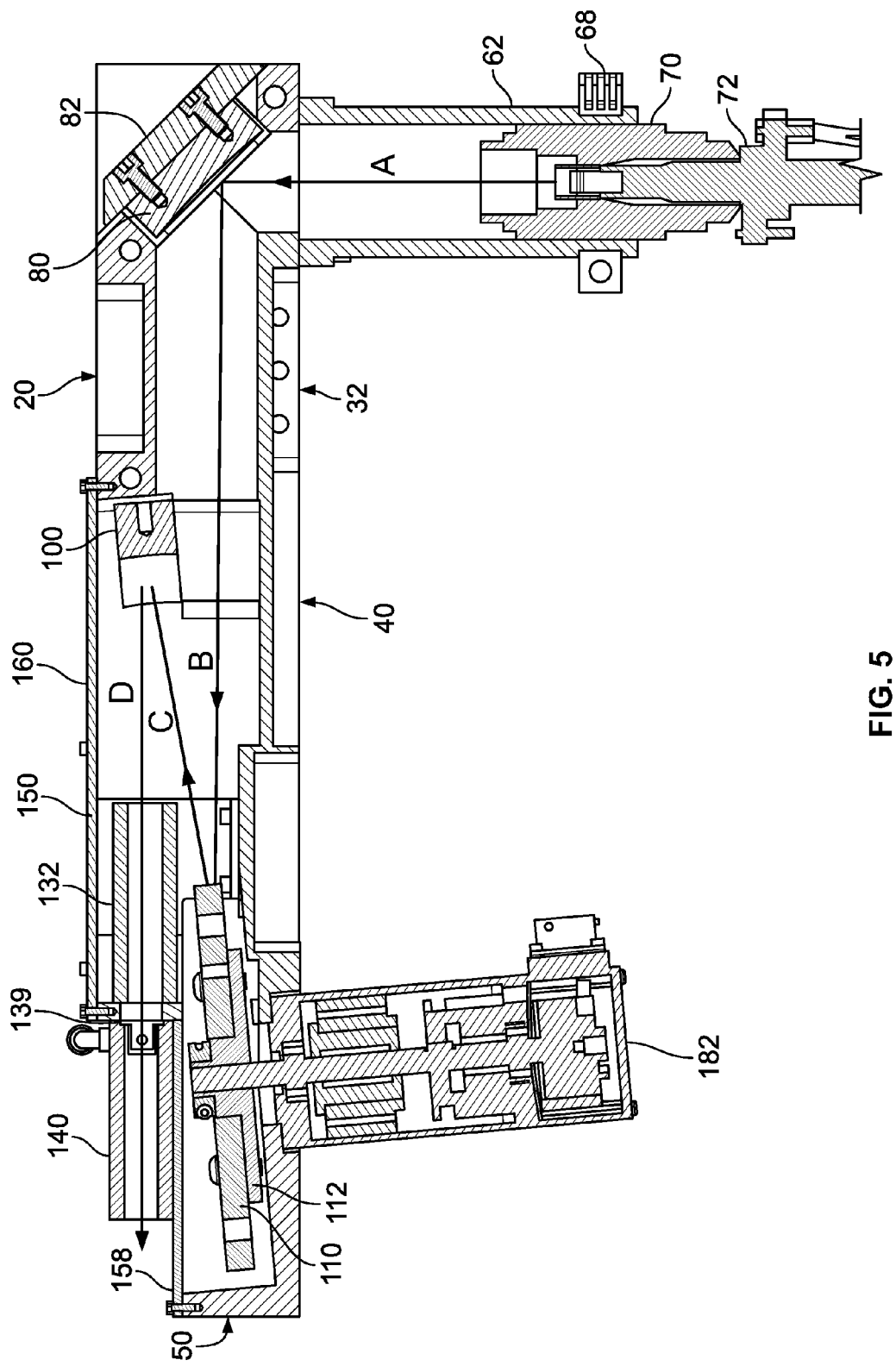
FIG. 5 is a cutaway side view of the laser scanner of FIG. 2 illustrating the changes in direction of the beam path through the device when in use.

With regard to the function of the laser scanner of the present invention, an input laser beam obtained from a beam delivery fiber or from a beam delivery tube is focused by aspheric mirror 80. The focal spot from this focusing optic may be circular, elliptical, or rectangular in shape, as determined by the figure (i.e., geometry) of the optic itself. As shown in FIGS. 4-5, the laser beam is produced by laser assembly 60 and is directed along path A. The focused laser beam is then reflected from aspheric mirror 80 along path B wherein it eventually impinges on multi-faceted, polygonal mirror 110. The facets of polygonal mirror 110 may be either flat or cylindrical in figure. They may also be tilted at multiple angles relative to the polygon's axis of rotation such that the resultant scanned laser beam path can be controlled in at least two directions. As previously indicated, rotation of polygonal mirror 110 is provided either by a high velocity flow of air or other gas or by electric motor 182. As polygonal mirror 110 rotates, the reflected, focused laser beam is repeatedly translated in one direction along an arc path toward reimaging mirror 100. After reflecting off rotating polygonal mirror 110, the laser beam passes through a first focal point along path C (see FIGS. 4-5) and diverges toward reimaging mirror 100, which is typically spherical. Reimaging mirror 100 produces a new image (which may be an enlarged image) of the first focal point and its path. This new image is then directed along path D, through nozzle assembly 130 and onto the work surface, i.e., substrate, where it is repeatedly scanned in one direction as the polygonal mirror rotates. In one exemplary embodiment, the beam spot on the work surface is substantially elliptical, with the elongation of the normally circular spot provided by either a toroidal surface on reimaging mirror 100 or a cylindrical surface on first focusing optic 80 or both.

An important feature of the scanner of the present invention is that the geometric parameters are selected such that the laser beam spot at the work surface follows a substantially flat path to maintain minimum or constant spot dimensions on a flat work surface (referred to as a "flat field condition"). If the surface has significant curvature in the fast scan direction, system parameters can be adjusted in real time to accommodate for the curvature. In particular, a motorized mechanism may used to make small adjustments in the distance between the intermediate focal plane and the polygon axis to create a curved process trajectory.

Figure 7:
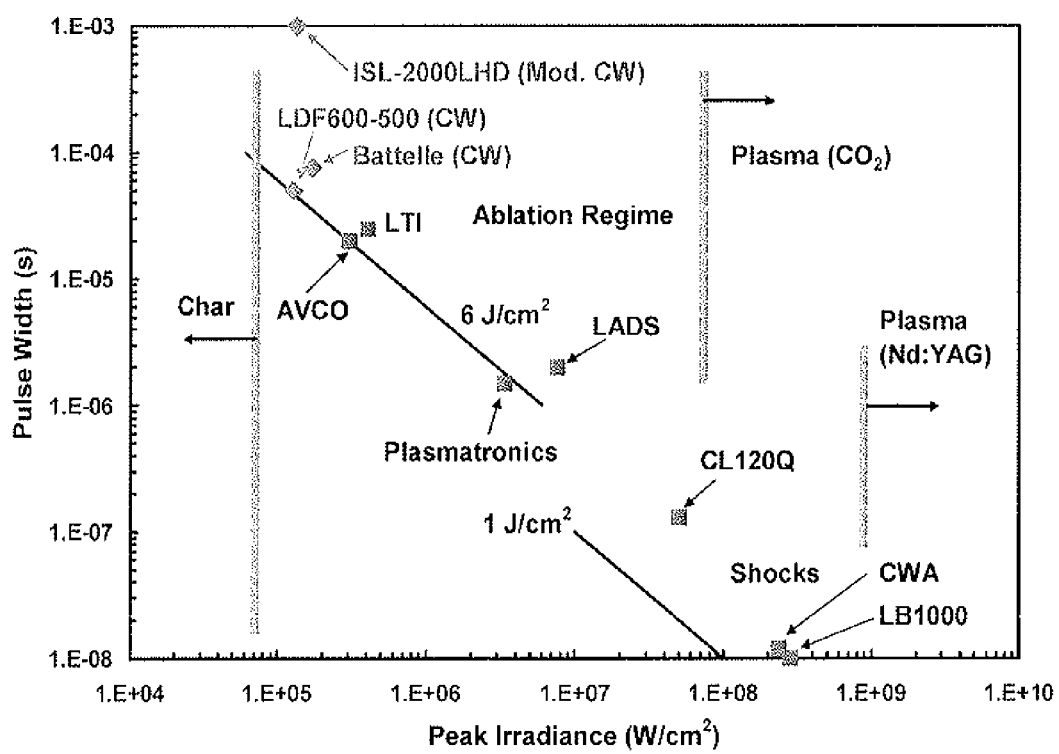
FIG. 7 is a graph showing laser paint removal conditions used in previously conducted research for scanned continuous and pulsed lasers.

For large area paint removal, high average power levels are required to achieve reasonable rates of removal. Since reliable and economical repetitively pulsed lasers are not available at the 5 to 10 kW average power level, continuous lasers are most appropriate for this task. The scanned continuous laser beam effectively provides pulses at the work surface as discussed below. FIG. 7 provides a graph showing previous laser research conditions for various paint removal efforts. The graph shows the effective pulse width at the surface as a function of the beam irradiance ($W/cm^2$). Notably, if the irradiance is too small (either low power or large spot areas), the paint tends to char and not remove cleanly. There is a wide range of operating irradiance levels where the paint ablates cleanly. At very high irradiance the beam is blocked by air plasma. Most successful paint removal has occurred at a fluence level of about 6 $J/cm^2$, whether an effective pulse from a scanned continuous laser or a pulsed laser. An advantage of higher laser power is the possibility of achieving higher surface irradiance levels than currently available. Higher irradiance levels may improve primer removal rates in the case of the fiber laser.

Figure 8:
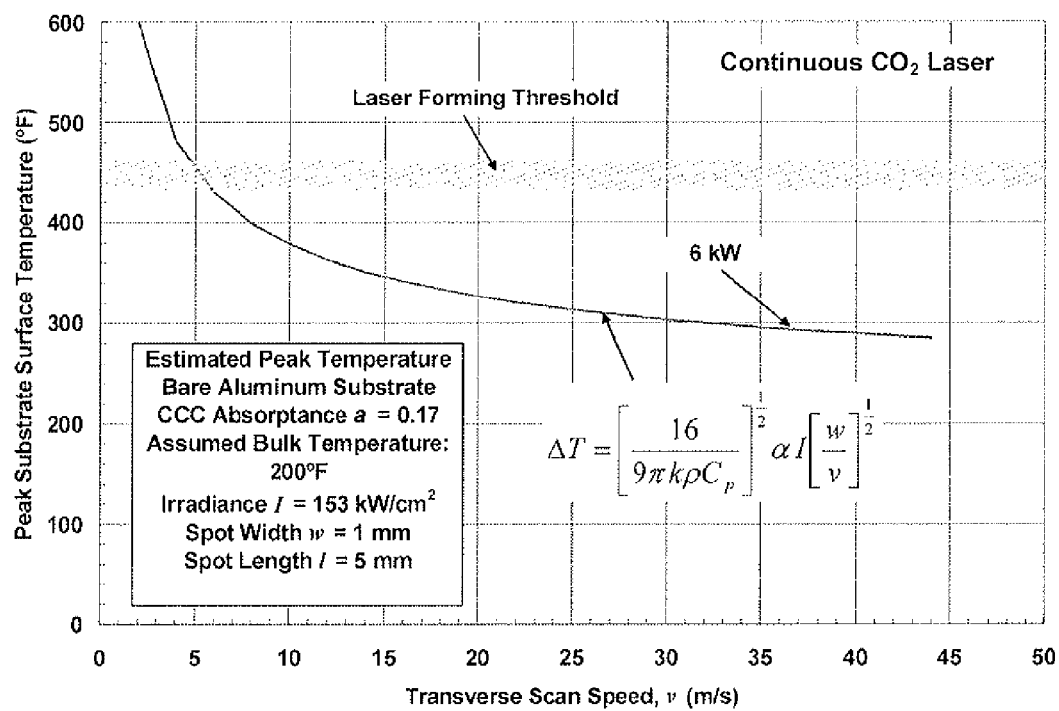
FIG. 8 is a graph showing peak surface temperature as a function of surface scan speed.

It is desirable to have an irradiance at the work surface greater that $10^5$ $W/cm^2$ to achieve clean ablation. At the same time, the scan of the pulse across the surface should be fast enough to avoid substrate alteration when the substrate is exposed. This is illustrated by the thermal estimate shown in FIG. 8 for a $CO_2$ laser. The graph shows an estimate of the peak front surface temperature reached locally on the surface of a chromate conversion coated (CCC) aluminum surface with a beam of 1-mm width scanned at various surface scan speeds perpendicular to the long dimension of the spot at 153 $kW/cm^2$. Scan speeds less than 10 m/s lead to peak front surface temperatures near those that will cause alteration of the substrate.

Motion of the entire scanner head perpendicular to the fast scan direction (by robotics, for example) provides area coverage and controls the bulk heating of the substrate, Slow sweeps of the scanner head remove more paint per pass, but risk higher bulk substrate heating when the substrate is exposed. High speed sweeps of the scanner head limit bulk substrate heating but may require more passes of the scanner head over the work surface, A variety of strategies may be employed to achieve high removal rates that may include a combination of robot program sweep speed variations and sensors to shut down laser power when substrate is detected.

In one embodiment, the polygonal scanner of the present invention includes a power handling capability of up to 10 kW; a laser wavelength of 1070 nm (fiber laser, also compatible with $CO_2$ laser operation); a surface scan speed of up to 50 m/s; beam spot dimensions at the work surface of 1.4 mm by 4 mm elliptical; a surface irradiance of 114 to 228 $kW/cm^2$ for power levels of 5 to 10 kW; a scan width of 140 mm; a laser interface having a standard QBH connector; and a weight of <40 lb.

For optimum performance of laser coating removal for certain applications, it may be necessary to sense in real time the progress of coating removal including detection of the revealing of the primer coat and revealing of the bare substrate itself. Laser device technologies to be employed in coating removal can change beam power on time scales of the order of 50 μs, which, for the scanner of the present invention, is of the order of the time required for the beam spot on the surface to move one beam width. Having appropriate sensing technology incorporated into the scan head permits adjustment of the laser power in real time when substrate is exposed. Multiple sensing approaches including on-axis and off-axis views of the surface are compatible with the present invention. Viewing through the effluent and filtering out plume glare appropriately are addressed by the scanner of this invention.

With regard to effluent removal, effluent is swept out of the beam path to both avoid laser beam attenuation and route the effluent efficiently to a vacuum collection system. In the past, air knives in combination with large vacuum ducts have worked fairly well. Incorporation of appropriate nozzles and ducts are aspects of the system of the present invention. Another important consideration is the conditions necessary to minimize organic material in the effluent that can combust downstream. The flow parameters of this scanner are varied to achieve high effluent capture efficiency and low organics while maintaining efficient coating removal.

A first important aspect of the present invention is the inclusion of all reflective optics. In prior art systems, high-thermal conductivity metal mirrors are typically used for transporting, shaping, and scanning the laser beam. Transmissive optics are more easily damaged by high laser beam irradiance and are usually made of low thermal conductivity material. Transmissive material has low absorbance, but can still heat, expand, and distort the laser beam because thermal conductivity is relatively low. Metal reflectors are more damage tolerant and less expensive to fabricate. The noble metals (silver and gold) and copper and aluminum are acceptable reflectors, with copper and aluminum being preferable. If reflective coatings are used, they are fabricated to withstand high laser irradiance. The use of metal reflectors permits using the same scanner for lasers having different wavelengths, which is generally not possible with transmissive optics.

A second important aspect of the present invention is aerodynamic beam exit aperture 138. The laser beam path layout includes a crossing point or cross-over region within or near aperture 138 (see FIG. 4) where the scanning beam is confined to a small cross-sectional area independent of the polygon rotation angle. The cross-over region is located between reimaging mirror 100 and the substrate work surface 200. By locating aperture 138 at the cross-over region, an aerodynamic opening may be implemented at that location for excluding dust and debris from the scanner enclosure without a transmissive window. Most known high power laser scanners include large, expensive transmissive windows to protect the optics inside the scanner housing from dust and debris. These windows are often damaged by laser heating of deposited dust or debris. The aerodynamic aperture 138 of this invention is simply an open port with gas (air, nitrogen, or inert gas) flowing out of the housing to deflect dust and particulate debris. A closure or shutter 139 for aperture 138 maybe used to exclude dust and debris from the optics in the scanner housing (i.e., body 20) when the laser is not operating. An electrical interlock switch on shutter 139 may be included to prevent the laser from operating when shutter 139 is in the closed position.

A third important aspect provided by some embodiments of the present invention is the inclusion of a gas driven polygonal mirror 110. Most prior art scanners employ motors or galvanometers that require electrical power and add mechanical complexity to the system. The polygon scanner of this invention may be configured to include a simple gas jet (air, nitrogen, or inert gas) directed at recess features on polygonal mirror 110 to impart rotational motion of the mirror. A simple proximity sensor (or the like) may be used to sense the rotational speed and for controlling the flow or a pressure valve in the gas train may be used to maintain a substantially constant speed. The gas jet that drives polygonal mirror also serves to cool the polygon and the other optics.

A fourth important aspect of the present invention are the tilted facets included on polygonal mirror 110. To minimize the peak temperature of the substrate surface occurring when substrate 200 is exposed to the scanned beam, it is useful for each scan location of the beam on the work surface to be offset from the previous scan of the beam in a direction perpendicular to the scan direction. This is accomplished by tilting each facet by a slight angle lateral to the plane of the wheel. In this manner, deposited heat will have more time to thermally conduct into the substrate prior to another scan exposure on the work surface. Each rotation of the wheel may expose N different strips on the surface, where N is the number of facets on the polygon wheel. The separation of the strips is dependent on the tilt angle difference from facet to facet.

A fifth important aspect of the present invention is the beam directing and focusing asymmetric asphere mirror 80. This mirror combines two functions into one optical element. First the mirror collects all of the beam rays coming from the laser and focuses them to a small spot at an intermediate focal plane and second it accomplishes a right angle turn of the laser beam. The latter is important in two respects: (i) for robotic processing of aircraft with low ground clearance, it permits the scanner to fit in small areas; and (ii) for manual processing of surfaces it permits ease of cable management. The mirror requirements are unique and the solution is a special diamond turned surface that has been optimized to meet these requirements while maintaining optical quality of the beam.

A sixth important aspect of the present invention is reimaging mirror 100. Reimaging mirror 100 receives the beam reflected from polygonal mirror 110 and reimages the spot formed at the intermediate focal plane to substrate 200. At the same time, a toroidal correction to the approximately spherical mirror stretches the original circular spot at the intermediate focal plane into an ellipse at the work surface. The elliptical spot at the work surface enables control of the paint removal process while limiting peak surface temperatures on bare substrates when exposed.

A seventh important aspect of the present invention is the real-time adjustable field curvature feature. This scanner maintains beam focus on the work surface over the length of the scan. Scanning curved surfaces includes a real time adjustment of the distance between the polygon and reimaging mirror to maintain focus on a curved surface.

An eighth important aspect provided by some embodiments of the present invention is the inclusion of a rotating joint (not shown in the Figures), which turns the beam at a right angle to the beam entrance direction. This is done while maintaining azimuthal symmetry in the laser beam as it approaches polygonal mirror 110. This allows a rotating joint to be placed in the housing so that the scan direction can be easily changed by rotating the axis of rotating polygonal mirror 110 without disturbing the laser beam input optical train (optical fiber or articulated arm).

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:

1. A laser scanner system for removing a coating from a surface, comprising:
    (a) at least one laser source, wherein the at least one laser source is operative to generate at least one laser beam;
    (b) at least one focusing optic, wherein the at least one focusing optic is operative to receive, focus and re-direct the at least one laser beam;
    (c) at least one rotating multi-faceted mirror for receiving and reflecting the focused laser beam, wherein the rotating multi-faceted mirror is operative to repeatedly translate the reflected focused laser beam in one direction along an arc path and through a first focal point, and wherein passage of the laser beam through the first focal point results in divergence of the laser beam;

(d) at least one reimaging mirror for receiving and reflecting the divergent laser beam toward a work surface, wherein the reimaging mirror is operative to produce an image of the first focal point and its path; and (e) wherein the at least one rotating multi-faceted mirror and the at least one reimaging mirror cooperate to produce a beam cross-over region having a minimal cross-sectional area relative to other points along the beam path, and wherein the beam cross-over region is located between the reimaging mirror and the work surface.

2. The laser scanner system of claim 1, further comprising a nozzle assembly through which the reimaged laser beam passes, wherein the nozzle assembly further includes:

(a) a first nozzle component, wherein the interior surface of first nozzle component tapers inward;

(b) a second nozzle component connected to the first nozzle component, wherein the interior surface of the second nozzle component tapers outward; and (c) an aperture through which the laser beam exits the scanner, wherein the aperture is located between the first and second nozzle components and is positioned in the vicinity of the crossover region.

3. The laser scanner system of claim 1, further comprising a housing for containing the at least one focusing optic, the at least one rotating multi-faceted mirror, and the at least one reimaging mirror.

4. The laser scanner system of claim 1, further comprising a motor connected to the multifaceted mirror, wherein the motor is operative to rotate the mirror.

5. The laser scanner system of claim 1, further comprising a source of pressurized gas in communication with the multi-faceted mirror, wherein the source of pressurized gas is operative to rotate the mirror.

6. The laser scanner system of claim 1, further comprising a vacuum assembly for removing debris from a surface from which a coating is being removed.

7. The laser scanner system of claim 1, further comprising robotic means for controlling the positioning and operation of the laser scanner system.

8. The laser scanner system of claim 1, wherein the first focusing optic further includes an asymmetric asphere mirror.

9. The laser scanner system of claim 1, wherein the at least one focusing optic further includes a parabolic mirror.

10. The laser scanner system of claim 1, wherein the at least one rotating multi-faceted mirror is polygonal.

11. The laser scanner system of claim 1, wherein the at least one reimaging mirror further includes a torodial mirror.

12. The laser scanner of claim 1, wherein the at least one focusing optic, the at least one rotating multi-faceted mirror, and the at least one reimaging mirror all include high-thermal conductivity metal.

13. The laser scanner of claim 2, wherein the aperture further includes a closeable shutter.

14. The laser scanner of claim 3, further comprising an outward flow of gas though the aperture for preventing contaminants from entering the housing.

15. A laser scanner system for removing a coating from a surface, comprising:

(a) at least one laser source, wherein the at least one laser source is operative to generate at least one laser beam;

(b) at least one focusing optic, wherein the at least one focusing optic is operative to receive, focus and re-direct the at least one laser beam;

(c) at least one rotating multi-faceted mirror for receiving and reflecting the focused laser beam, wherein the rotating multi-faceted mirror is operative to repeatedly translate the reflected focused laser beam in one direction along an arc path and through a first focal point, and wherein passage of the laser beam through the first focal point results in divergence of the laser beam;

(d) at least one reimaging mirror for receiving and reflecting the divergent laser beam toward a work surface, wherein the reimaging mirror is operative to produce an image of the first focal point and its path;

(e) wherein the at least one rotating multi-faceted mirror and the at least one reimaging mirror cooperate to produce a beam cross-over region having a minimal cross-sectional area relative to other points along the beam path, and wherein the beam cross-over region is located between the reimaging mirror and the work surface; and (f) a nozzle assembly through which the reimaged laser beam passes, wherein the nozzle assembly further includes:

(i) a first nozzle component, wherein the interior surface of first nozzle component tapers inward;

(ii) a second nozzle component connected to the first nozzle component, wherein the interior surface of the second nozzle component tapers outward; and (iii) an aperture through which the laser beam exits the scanner, wherein the aperture is located between the first and second nozzle components and is positioned in the vicinity of the crossover region.

16. The laser scanner system of claim 15, further comprising a housing for containing the at least one focusing optic, the at least one rotating multi-faceted mirror, and the at least one reimaging mirror.

17. The laser scanner system of claim 15, further comprising a motor connected to the multifaceted mirror, wherein the motor is operative to rotate the mirror.

18. The laser scanner system of claim 15, further comprising a source of pressurized gas in communication with the multi-faceted mirror, wherein the source of pressurized gas is operative to rotate the mirror.

19. The laser scanner system of claim 15, further comprising a vacuum assembly for removing debris from a surface from which a coating is being removed.

20. The laser scanner system of claim 15, further comprising robotic means for controlling the positioning and operation of the laser scanner system.

21. The laser scanner system of claim 15, wherein the first focusing optic further includes an asymmetric asp here mirror.

22. The laser scanner system of claim 15, wherein the at least one focusing optic further includes a parabolic mirror.

23. The laser scanner system of claim 15, wherein the at least one rotating multi-faceted mirror is polygonal.

24. The laser scanner system of claim 15, wherein the at least one reimaging mirror further includes a torodial mirror.

25. The laser scanner of claim 15, wherein the at least one focusing optic, the at least one rotating multi-faceted mirror, and the at least one reimaging mirror all include high-thermal conductivity metal.

26. The laser scanner of claim 15, wherein the aperture further includes a closeable shutter.

27. The laser scanner of claim 16, further comprising an outward flow of gas though the aperture for preventing contaminants from entering the housing.

28. A laser scanner system for removing a coating from a surface, comprising:

(a) at least one laser source, wherein the at least one laser source is operative to generate at least one laser beam;

(b) at least one focusing optic, wherein the at least one focusing optic is operative to receive, focus and re-direct the at least one laser beam;

(c) at least one rotating multi-faceted mirror for receiving and reflecting the focused laser beam, wherein the rotating multi-faceted mirror is operative to repeatedly translate the reflected focused laser beam in one direction along an arc path and through a first focal point, and wherein passage of the laser beam through the first focal point results in divergence of the laser beam;

(d) at least one reimaging mirror for receiving and reflecting the divergent laser beam toward a work surface, wherein the reimaging mirror is operative to produce an image of the first focal point and its path;

(e) wherein the at least one rotating multi-faceted mirror and the at least one reimaging mirror cooperate to produce a beam cross-over region having a minimal cross-sectional area relative to other points along the beam path, and wherein the beam cross-over region is located between the reimaging mirror and the work surface;

(f) a nozzle assembly through which the reimaged laser beam passes, wherein the nozzle assembly further includes:
  (i) a first nozzle component, wherein the interior surface of first nozzle component tapers inward;
  (ii) a second nozzle component connected to the first nozzle component, wherein the interior surface of the second nozzle component tapers outward; and
  (iii) an aperture through which the laser beam exits the scanner, wherein the aperture is located between the first and second nozzle components and is positioned in the vicinity of the crossover region; and (g) a housing for containing the at least one focusing optic, the at least one rotating multifaceted mirror, and the at least one reimaging mirror.

29. The laser scanner system of claim 28, further comprising a motor connected to the multifaceted mirror, wherein the motor is operative to rotate the mirror.

30. The laser scanner system of claim 28, further comprising a source of pressurized gas in communication with the multi-faceted mirror, wherein the source of pressurized gas is operative to rotate the mirror.

31. The laser scanner system of claim 28, further comprising a vacuum assembly for removing debris from a surface from which a coating is being removed.

32. The laser scanner system of claim 28, further comprising robotic means for controlling the positioning and operation of the laser scanner system.

33. The laser scanner system of claim 28, wherein the first focusing optic further includes an asymmetric asp here mirror.

34. The laser scanner system of claim 28, wherein the at least one focusing optic further includes a parabolic mirror.

35. The laser scanner system of claim 28, wherein the at least one rotating multi-faceted mirror is polygonal.

36. The laser scanner system of claim 28, wherein the at least one reimaging mirror further includes a torodial mirror.

37. The laser scanner of claim 28, wherein the at least one focusing optic, the at least one rotating multi-faceted mirror, and the at least one reimaging mirror all include high-thermal conductivity metal.

38. The laser scanner of claim 28, wherein the aperture further includes a closeable shutter.

39. The laser scanner of claim 28, further comprising an outward flow of gas though the aperture for preventing contaminants from entering the housing.

* * * * *